United States Patent
Cao et al.

(10) Patent No.: US 9,424,866 B1
(45) Date of Patent: Aug. 23, 2016

(54) HEAT ASSISTED MAGNETIC RECORDING WRITE APPARATUS HAVING A DIELECTRIC GAP

(71) Applicant: Western Digital (Fremont), LLC, Fremont, CA (US)

(72) Inventors: Jiangrong Cao, Fremont, CA (US); Brad V. Johnson, Santa Clara, CA (US); Michael V. Morelli, San Jose, CA (US); Peng Zhang, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/864,716

(22) Filed: Sep. 24, 2015

(51) Int. Cl.
| | |
|---|---|
| G11B 5/127 | (2006.01) |
| G11B 5/31 | (2006.01) |
| G11B 5/48 | (2006.01) |
| G11B 5/60 | (2006.01) |
| G11B 7/124 | (2012.01) |
| G11B 5/00 | (2006.01) |

(52) U.S. Cl.
CPC ........... *G11B 5/4866* (2013.01); *G11B 5/1278* (2013.01); *G11B 5/314* (2013.01); *G11B 5/3133* (2013.01); *G11B 5/6082* (2013.01); *G11B 7/124* (2013.01); *G11B 2005/0021* (2013.01)

(58) Field of Classification Search
CPC ... G11B 5/1278; G11B 5/3133; G11B 5/314; G11B 7/124
USPC ........................ 360/125.3, 125.31; 369/13.33
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |

(Continued)

*Primary Examiner* — Jefferson Evans (57) ABSTRACT

A heat assisted magnetic recording (HAMR) write apparatus coupled with a laser is described. The HAMR write apparatus includes a pole, coil(s), a near-field transducer (NFT), and a dielectric gap. The pole writes to the media. The coil(s) energize the pole. The waveguide is optically coupled with the laser and directs energy toward the ABS. The NFT is optically coupled with the waveguide and includes a metal nose and a metal cap. Part of the metal cap adjoins part of the main pole. The dielectric gap is between a first portion of the NFT and the main pole. The dielectric gap has a media-facing surface and back, top, bottom and side surfaces. The top surface adjoins the main pole. The bottom surface adjoins the first portion of the NFT. The side surfaces adjoin a second portion of the NFT. The back surface adjoins a portion of the metal cap.

19 Claims, 7 Drawing Sheets

(56) References Cited

U.S. PATENT DOCUMENTS

| | | |
|---|---|---|
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |

(56) References Cited

U.S. PATENT DOCUMENTS

| | | |
|---|---|---|
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et a |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |

(56) References Cited

U.S. PATENT DOCUMENTS

| | | |
|---|---|---|
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,451,705 B2 | 5/2013 | Peng et al. |

(56) References Cited

U.S. PATENT DOCUMENTS

| | | |
|---|---|---|
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,711,662 B2 | 4/2014 | Lee et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,929,698 B2 | 1/2015 | Peng et al. |
| 8,953,272 B2 | 2/2015 | Peng et al. |
| 9,129,634 B1 * | 9/2015 | Boone, Jr. ............ G11B 5/6088 |
| 9,183,856 B1 * | 11/2015 | Balamane ................ G11B 5/39 |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0279035 A1 | 10/2013 | Peng et al. |
| 2014/0154529 A1 | 6/2014 | Yang et al. |
| 2014/0175050 A1 | 6/2014 | Zhang et al. |
| 2014/0209664 A1 * | 7/2014 | Takayama ............... G11B 5/105 228/104 |
| 2014/0313872 A1 * | 10/2014 | Rawat ................... G11B 13/045 369/13.33 |
| 2014/0362674 A1 * | 12/2014 | Tanaka ................... G11B 21/12 369/13.17 |
| 2014/0376349 A1 * | 12/2014 | Cheng ................. G11B 5/6088 369/13.33 |
| 2015/0179204 A1 * | 6/2015 | Mosendz ............. G11B 5/7325 369/13.33 |
| 2015/0262595 A1 * | 9/2015 | Aoki ..................... G11B 5/6088 369/13.11 |
| 2015/0340052 A1 * | 11/2015 | Sankar ................. G11B 5/6088 369/13.33 |

* cited by examiner

HEAT ASSISTED MAGNETIC RECORDING WRITE APPARATUS HAVING A DIELECTRIC GAP

BACKGROUND

A conventional heat assisted magnetic recording (HAMR) transducer typically includes at least a waveguide, a near-field transducer (NFT), a main pole and a coil for energizing the main pole. The conventional HAMR transducer uses light, or energy, received from a conventional laser in order to write to a magnetic recording media. Light from the laser is incident on and coupled into the waveguide. Light is guided by the conventional waveguide to the NFT near the ABS. The NFT focuses the light to magnetic recording media (not shown), such as a disk. This region is thus heated. The main pole is energized and field from the pole tip is used to write to the heated portion of the recording media.

Although the conventional HAMR transducer functions, improvements in performance are still desired. For example, the location of the hot spot on the media, temperature gradient and distance between the media hot spot and the write pole are desired to be controlled.

DETAILED DESCRIPTION OF THE PREFERRED EMBODIMENTS

Figure 1:
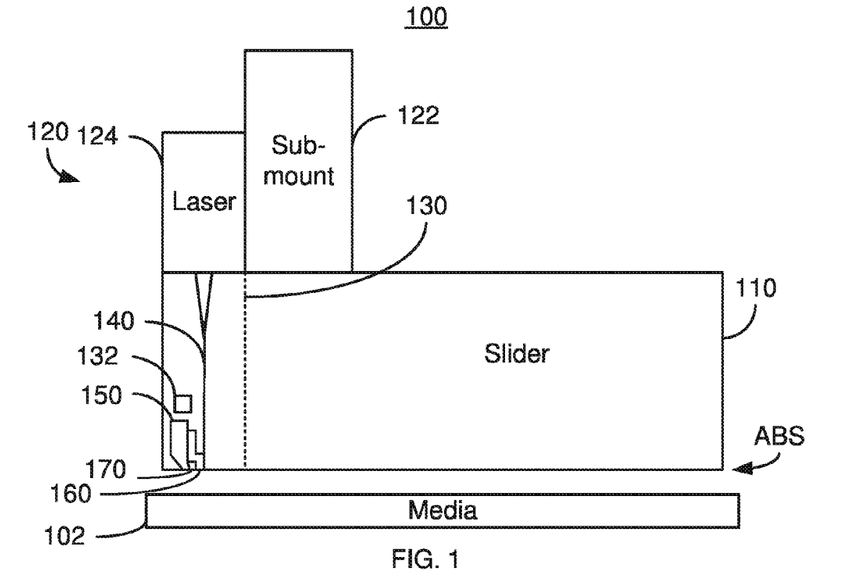
FIG. 1 is a diagram depicting a side view of an exemplary embodiment of a HAMR disk drive.
Figure 2A:
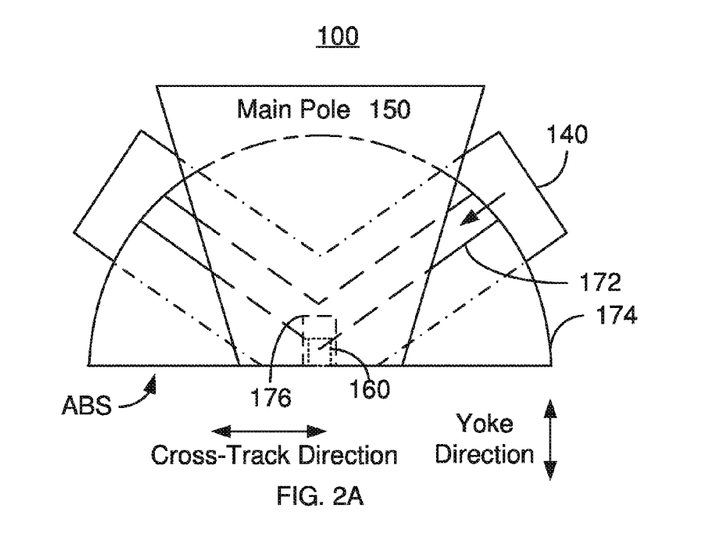
FIGS. 2A, 2B and 2C are diagrams depicting plan, apex and ABS views of an exemplary embodiment of a portion of a HAMR disk drive.
Figure 2B:
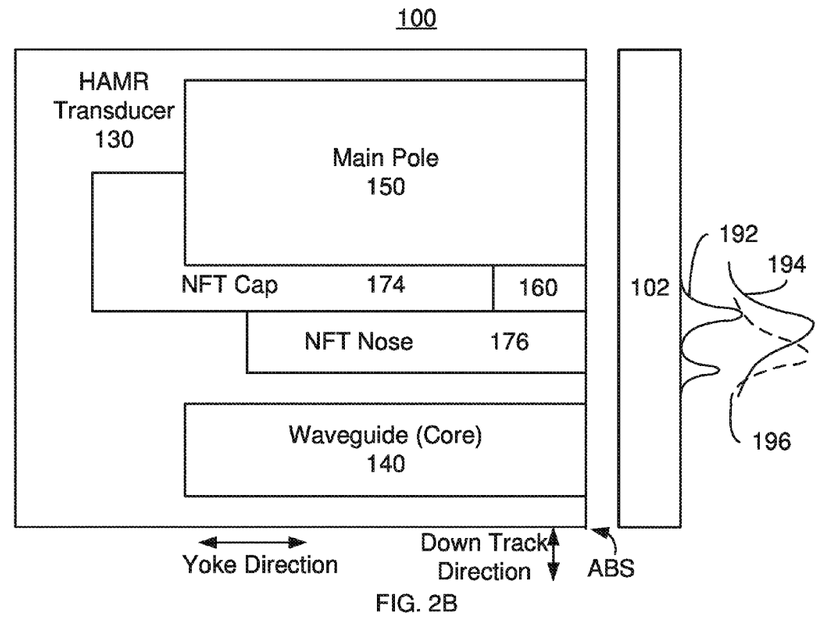
Figure 2C:
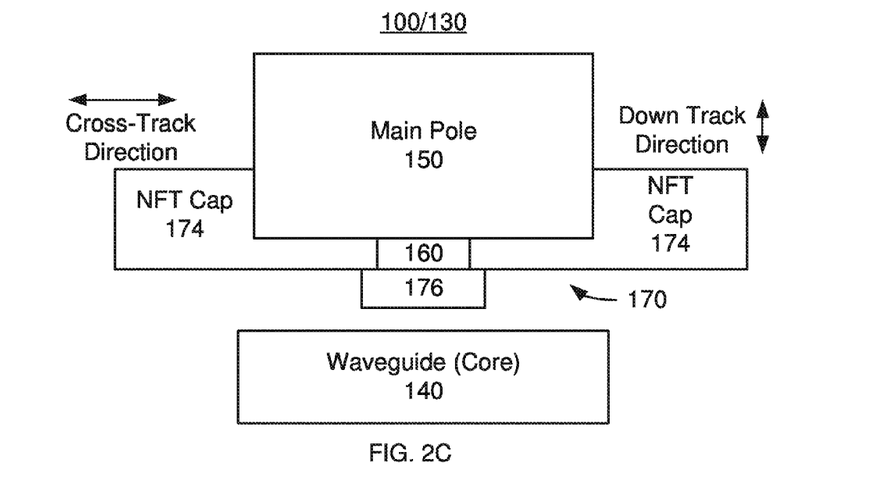

FIG. 1 depicts a side view of an exemplary embodiment of a portion of a heat-assisted magnetic recording (HAMR) write apparatus, or disk drive 100. FIGS. 2A, 2B AND 2C depict plan, apex and ABS views of a portion of the HAMR disk drive 100. For clarity, FIGS. 1, 2A, 2B and 2C are not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components are shown. However, multiples of each component and their sub-components, might be used.

The HAMR disk drive 100 includes media 102, a slider 110, a laser subassembly 120 and a HAMR transducer 130. Additional and/or different components may be included in the HAMR disk drive 100. Although not shown, the slider 110, and thus the laser assembly 120 and HAMR transducer 130 are generally attached to a suspension. The laser assembly 120 includes a laser 122 and a submount 124. The submount 124 is a substrate to which the laser 122 may be affixed for improved mechanical stability, heat sinking, ease of manufacturing and better robustness. The laser 122 may be a chip such as a laser diode or other laser. Although not shown, the laser subassembly 120 may include a photodetector which sample light tapped from the waveguide of the HAMR transducer 130.

The HAMR transducer 130 is fabricated on the slider 110 and includes an air-bearing surface (ABS) proximate to the media 102 during use. In general, the HAMR write transducer 130 and a read transducer are present in the HAMR write apparatus 100. However, for clarity, only the HAMR write transducer 130 is shown. The HAMR transducer 130 includes coil(s) 132, a waveguide 140, write pole 150, dielectric gap 160 and near-field transducer (NFT) 170. The waveguide 140 is optically coupled with the laser 122. The waveguides 140 carry light energy from the laser 122 toward the ABS. The NFT 170 couples a portion of this energy from the waveguides 140 to the media 102. The write pole 150 is energized by the coils 132 and writes to the heated portion of the media 102. The coil(s) 132 may be solenoidal or spiral (pancake) coils. Other components including but not limited to other poles and/or shields may also be present.

One configuration of the dielectric gap 160, NFT 170, and portion of the waveguide 140 near the ABS may be better seen in FIGS. 2A-2C. Note that the structure labeled as the waveguide 140 may be considered to be the waveguide core. The surrounding cladding, though functionally part of the waveguide is not separately labeled in the drawings. The NFT 170 includes an optional plasmonic ridge 172, cap 174 and nose 176, each of which are typically formed of a metal such as Au. The plasmonic ridge 172 generally runs along the direction of transmission of the waveguide 140. In the embodiment shown, this direction is at an acute angle from the ABS. However, other angles are possible in other embodiments. The NFT cap 174 extends over a relatively large area, greater than the pole at the ABS. For example, the NFT cap 174 may be semicircular with a radius of approximately seven hundred through nine hundred nanometers. Other shapes and sizes are, however, possible. The NFT cap 174 aids in heat dissipation and provides a boundary for the optical field of the NFT. Part of the NFT cap 174 adjoins the pole 150 near the ABS. The NFT nose 176 is smaller than the NFT cap. In some embodiments, the NFT nose 176 is not more than fifty nanometers wide in the cross-track direction. In some such embodiments, the NFT nose 176 is nominally forty nanometers wide in the cross-track direction. In some embodiments the thickness of the nose 176 in the down track direction is on the order of fifteen through twenty-five nanometers. Other sizes are, however, possible.

The dielectric gap 160 resides between a portion of the NFT 170 and the main pole 150 at and near the ABS. The NFT cap 174 does cover the sides and the back (distal from the ABS) of the dielectric gap 160. Similarly, the NFT nose 176 adjoins the bottom of the dielectric gap 160. In the embodiment shown in FIGS. 2A-2C, therefore, the dielectric gap 160 is surrounded by the NFT 170 except for the surface that occupies the ABS. In some embodiments, the dielectric gap 150 is an oxide, such as silicon oxide. Thus, the dielectric gap 160 may be formed of the same material as the cladding of the waveguide 140. However, other dielectrics/oxides, including those not used in the waveguide 140, may be used. In general, the dielectric gap 160 may be desired to have a relatively low index of refraction. Consequently, the materials used in the core of the waveguide 140 might not be used for the dielectric gap 160 in some embodiments. For reliability, the dielectric gap 160 materials are also desired to be able to sustain high temperatures developed in the region of the NFT 160 without breaking down. In addition, the dielectric gap 160 may be unlikely to allow for diffusion of surrounding materials, such as Fe in the pole 150 and/or Au in the NFT 170. In the embodiment shown, the width of the dielectric gap 160 is slightly less than that of the NFT nose 176. In some embodiments, the width of the oxide gap 160 is substantially the same as the width of the NFT nose 176. However, other widths are possible. The dielectric gap 160 also has a thickness in the down track direction and a length in the yoke direction. In general, the thickness, width and length of the dielectric gap 160 may be similar to those of the NFT nose 176. However, in other embodiments, these features differ. In some embodiments, the dielectric gap 160 may be desired to be the same size as or larger than the NFT nose 176. In general, if the dielectric gap 160 extends further in the yoke direction, the thickness in the down track direction and/or the width in the cross-track direction may be reduced.

As discussed above, the NFT 170 couples the optical energy carried by the waveguide 140 into the media 102. The optical spot formed on the media 102 has a characteristic spot size, peak intensity location, and power gradient. The thermal spot on the media 102 has a corresponding size, peak temperature location and thermal gradient. The presence of the dielectric gap 160 between the NFT nose 176 and the main pole 150 may shift a peak in the energy delivered to the media 102 by the NFT 170 in the down track direction. Thus, the peak may be closer to the main pole 150. In addition, the gradient in the energy may be higher on the side of the peak that is closer to the main pole 150. Because the shape and location of the energy peak delivered to the media 102 have been changed, the heating of the media is also affected. In particular, the peak in temperature of the thermal spot for the media 102 is shifted in the down track direction to be closer to the main pole 150. Further, the temperature gradient for the thermal spot his higher closer to the main pole 150. Both the closer proximity to the main pole 150 and the higher thermal gradient are desirable.

This benefit can be seen in curves 192, 194 and 196 in FIG. 2B. Note that curves 192, 194 and 196 are representative only and not meant to depict actual data. Curve 192 depicts the thermal profile due to individual optical peaks. Curve 194 is the superposition of the peaks and represents the thermal profile due to the laser power coupled into the media 102 via the NFT 170. The dashed curve 196 indicates the thermal profile in the absence of the dielectric gap. As can be seen, the presence of the dielectric gap 160 shifts the peak in the thermal profile 194 toward the main pole 150 from the position it would occupy in the absence of the dielectric gap 160 (shown by dashed curve 196). In addition, the gradient in the thermal profile 194 is higher in the region closer to the main pole 150. Thus, the thermal profile 194 may allow for a higher magnetic field amplitude in the higher temperature region of the media. In addition, the presence of the dielectric gap 160 may result in flattening of isothermal lines in the cross-track direction. Flatter isothermal lines may lead to less curvature in the written bits. This may lead to bits which better match the profile of the reader (not shown). This may lead to a higher read signal to noise ratio. As such performance of the HAMR transducer 100 and reader (not shown) of the HAMR disk drive 100 may be improved.

Figure 3A:
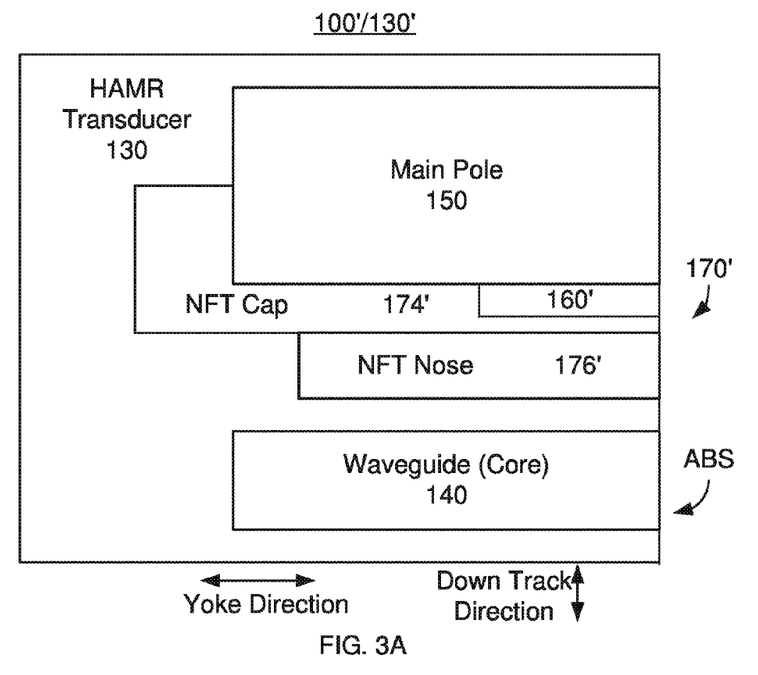
FIGS. 3A and 3B are diagrams depicting apex and ABS views of another exemplary embodiment of a portion of a HAMR disk drive.
Figure 3B:
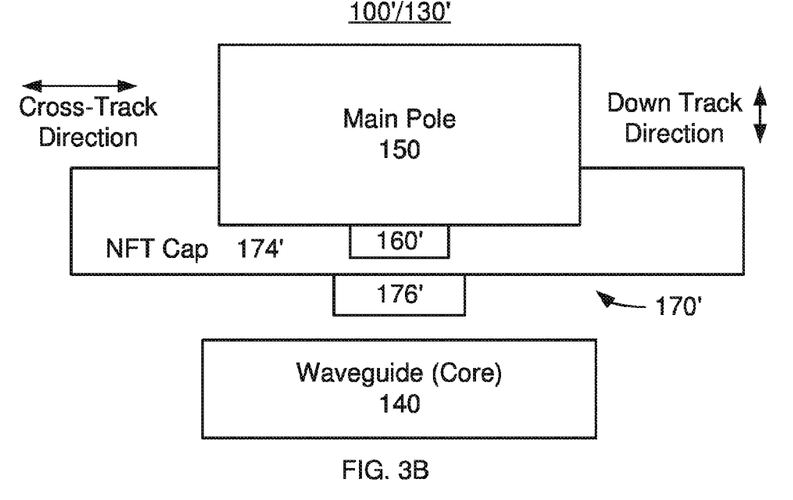

FIGS. 3A and 3B depict apex and ABS views of another exemplary embodiment of a portion of the HAMR disk drive 100' and transducer 130'. For clarity, FIGS. 3A-3B are not to scale. For simplicity not all portions of the HAMR disk drive 100' are shown. In addition, although the HAMR disk drive 100' is depicted in the context of particular components other and/or different components may be used. Further, the arrangement of components may vary in different embodiments. The HAMR disk drive 100' is analogous to the HAMR disk drive 100. Consequently, similar components have analogous labels. The HAMR transducer 130' thus includes waveguide 140, main pole 150, dielectric gap 160' and NFT 170' that are analogous to the waveguides 140, main pole 150, dielectric gap 160 and NFT 170, respectively. For clarity, components such as the laser, media, optional plasmonic ridge and other components are not shown.

The NFT 170' includes the NFT nose 176' and the NFT cap 174' that are analogous to the NFT nose 176 and NFT cap 174, respectively. In the embodiment shown, a portion of the NFT cap 174' resides between the NFT nose 176' and the dielectric gap 160'.

The disk drive 100' and transducer 130' share the benefits of the HAMR disk drive 100 and transducer 130. The presence of the dielectric gap 160' between a portion of the NFT 170' (the cap 174' and nose 176') and the main pole 150 at and near the ABS. Thus, the peak in the thermal profile is shifted in the down track direction toward the main pole 150 for the HAMR transducer 130'. In addition, the gradient in the thermal profile may be increased. The isothermal lines in the cross-track direction may also be flattened. Thus, writing and reading for the transducer 130' and HAMR disk drive 100' may be improved.

Figure 4A:
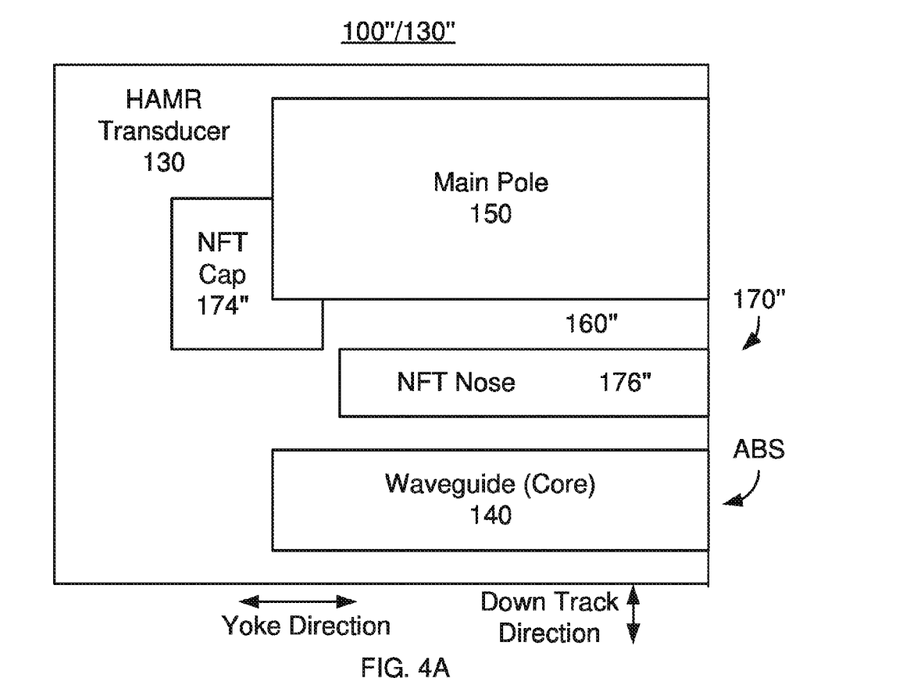
FIGS. 4A and 4B are diagrams depicting apex and ABS views of another exemplary embodiment of a portion of a HAMR disk drive.
Figure 4B:
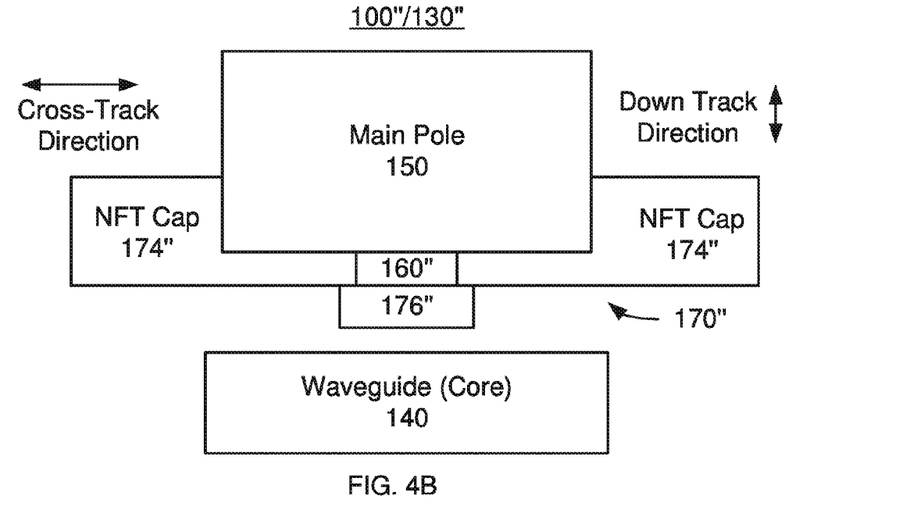

FIGS. 4A and 4B depict apex and ABS views of another exemplary embodiment of a portion of the HAMR disk drive 100" and transducer 130". For clarity, FIGS. 4A-4B are not to scale. For simplicity not all portions of the HAMR disk drive 100" are shown. In addition, although the HAMR disk drive 100" is depicted in the context of particular components other and/or different components may be used. Further, the arrangement of components may vary in different embodiments. The HAMR disk drive 100" is analogous to the HAMR disk drive 100 and/or 100'. Consequently, similar components have analogous labels. The HAMR transducer 130" thus includes waveguide 140, main pole 150, dielectric gap 160" and NFT 170" that are analogous to the waveguides 140, main pole 150, dielectric gap 160/160' and NFT 170/170', respectively. For clarity, components such as the laser, media, optional plasmonic ridge and other components are not shown.

The NFT 170" includes the NFT nose 176" and the NFT cap 174" that are analogous to the NFT nose 176/176' and NFT cap 174/174', respectively. The NFT cap 174" does cover the sides and a portion of the back of the dielectric gap 160". Similarly, the NFT nose 176" adjoins a portion of the bottom of the dielectric gap 160". In the embodiment shown, there is a small space between the NFT cap 174" and the NFT nose 176" in the region opposite to the ABS. Thus, the dielectric gap 160" is not surrounded by the NFT 170".

The disk drive 100" and transducer 130" share the benefits of the HAMR disk drive 100/100' and transducer 130/130'. The presence of the dielectric gap 160" between a portion of the NFT 170" (the nose 176") and the main pole 150 at and near the ABS. Thus, the peak in the thermal profile is shifted in the down track direction toward the main pole 150 for the HAMR transducer 130". In addition, the gradient in the thermal profile may be increased. The isothermal lines in the cross-track direction may also be flattened. Thus, writing and reading for the transducer 130" and HAMR disk drive 100" may be improved.

Figure 5:
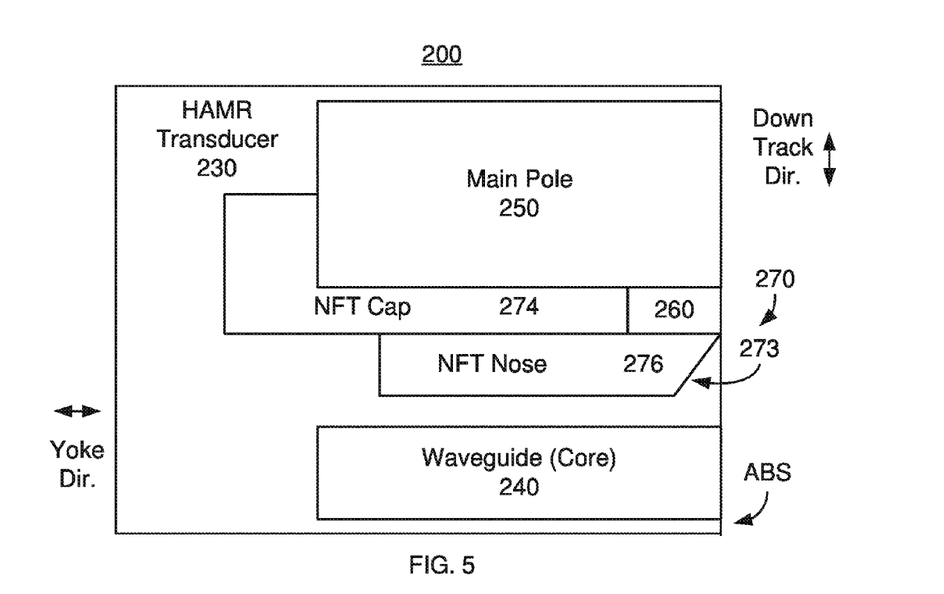
FIG. 5 is a diagram depicting an apex view of another exemplary embodiment of a HAMR disk drive.

FIG. 5 depicts an apex view of another exemplary embodiment of a portion of the HAMR disk drive 200 and transducer 230. For clarity, FIG. 5 is not to scale. For simplicity not all portions of the HAMR disk drive 200 are shown. In addition, although the HAMR disk drive 200 is depicted in the context of particular components other and/or different components may be used. Further, the arrangement of components may vary in different embodiments. The HAMR disk drive 200 is analogous to the HAMR disk drives 100, 100' and/or 100". Consequently, similar components have analogous labels. The HAMR transducer 230 thus includes waveguide 240, main pole 250, dielectric gap 260 and NFT 270 that are analogous to the waveguides 140, main pole 150, dielectric gap 160/160'/160" and NFT 170/170'/170", respectively. For clarity, components such as the laser, media, optional plasmonic ridge and other components are not shown.

The NFT 270 includes the NFT nose 276 and the NFT cap 274 that are analogous to the NFT nose 176/176'/176" and NFT cap 174/174'/174", respectively. The NFT cap 274 adjoins the sides and a portion of the back of the dielectric 260. Similarly, the NFT nose 276 adjoins the bottom of the dielectric gap 260. In addition, the NFT nose 276 has a media-facing surface (MFS) 273 that does not reside only at the ABS. Instead, the MFS 273 is shaped. In particular, the MFS 273 is angled from the ABS. In the embodiment shown, the MFS 273 is a smooth ramp. In other embodiments, the MFS 273 may be stepped, curved or have another geometry. However, the MFS 273 is shaped such that the portion of the NFT nose 276 closest to the main pole 250 is also closest to, or occupies, the ABS. Because the MFS 273 is angled, the MFS 273 further directs the laser power coupled into the media toward the pole 250. Thus, subtle changes in the system may be less likely to affect performance of the HAMR transducer 230. Note that in order to facilitate formation of the MFS, the NFT nose 272 and/or gap 264 the NFT 270 may be thicker in the down track direction. For example, in some embodiments, the NFT thickness may be on the order of at least fifty nanometers. In some embodiments, the thickness may be in excess of eighty nanometers. However, other thicknesses for the NFT cap 272 may be used.

The disk drive 200 and transducer 230 share the benefits of the HAMR disk drive 100, 100' and/or 100" and transducer 130, 130' and/or 130". The presence of the dielectric gap 260 between a portion of the NFT 270 and the main pole 250 at and near the ABS. Thus, the peak in the thermal profile is shifted in the down track direction toward the main pole 250 for the HAMR transducer 230. In addition, the gradient in the thermal profile may be increased. The isothermal lines in the cross-track direction may also be flattened. Inclusion of the MFS 273 further directs the thermal profile toward the main pole 250. Thus, writing and reading for the transducer 230 and HAMR disk drive 200 may be improved.

Figure 6:
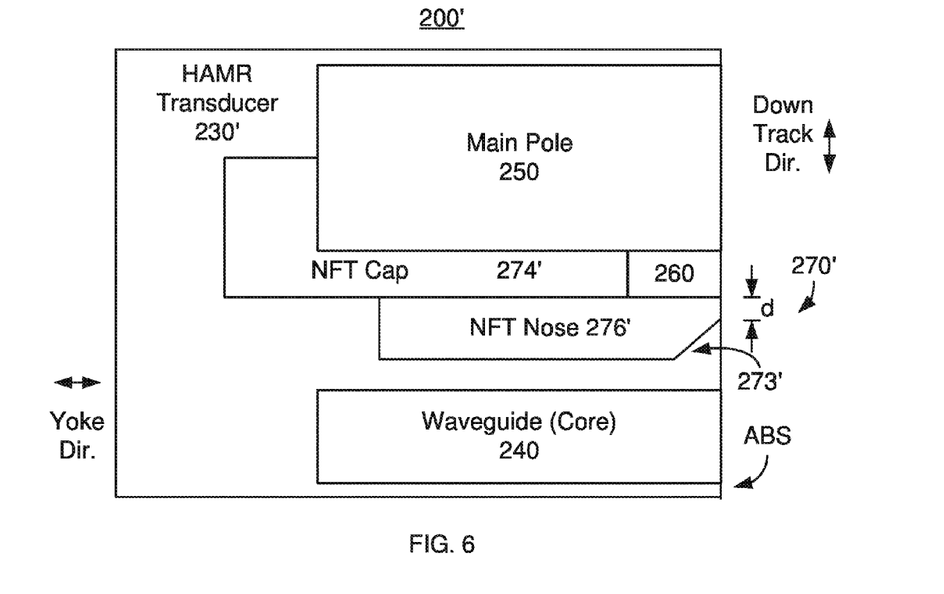
FIG. 6 is a diagram depicting an apex view of another exemplary embodiment of a HAMR disk drive.

FIG. 6 depicts an apex view of another exemplary embodiment of a portion of the HAMR disk drive 200' and transducer 230'. For clarity, FIG. 6 is not to scale. For simplicity not all portions of the HAMR disk drive 200' are shown. In addition, although the HAMR disk drive 200' is depicted in the context of particular components other and/or different components may be used. Further, the arrangement of components may vary in different embodiments. The HAMR disk drive 200' is analogous to the HAMR disk drives 100, 100', 100" and/or 200. Consequently, similar components have analogous labels. The HAMR transducer 230' thus includes waveguide 240, main pole 250, dielectric gap 260 and NFT 270' that are analogous to the waveguides 140, main pole 150, dielectric gap 160/160'/160"/260 and NFT 170/170'/170"/270, respectively. For clarity, components such as the laser, media, optional plasmonic ridge and other components are not shown.

The NFT 270' includes the NFT nose 276' and the NFT cap 274' that are analogous to the NFT nose 176/176'/176"/276 and NFT cap 174/174'/174"/274, respectively. The NFT cap 274' adjoins the sides and the back of the dielectric gap 260. The NFT nose 276' adjoins the bottom of the dielectric gap 260. In addition, the NFT nose 276' has a MFS 273' that is analogous to the MFS 273 and, therefore, is shaped. In the embodiment shown in FIG. 6, the MFS 273' has a portion at the ABS and a portion that is angled from the ABS. The angled portion of the MFS 273' is shown as smooth, but may have another geometry. The remaining portion having height, d, occupies a part of the ABS. In some embodiments, d is at least five nanometers. In addition, d may be less than forty nanometers. In some cases, d is not more than approximately twenty nanometers. In some such embodiments, d is at least ten nanometers. Because a portion of the MFS 273' is angled, the MFS 273' further directs the laser power coupled into the media toward the pole 250. Because a portion of the MFS resides at the ABS, power through the MFS 273' may be not overheat. Thus, subtle changes in the system may be less likely to affect performance of the HAMR transducer 230' without adversely affecting the reliability of the HAMR transducer 230'.

The disk drive 200' and transducer 230' share the benefits of the HAMR disk drive 100, 100', 100" and/or 200 and transducer 130, 130', 130" and/or 200. The presence of the dielectric gap 260 between a portion of the NFT 270' and the main pole 250 at and near the ABS. Thus, the peak in the thermal profile is shifted in the down track direction toward the main pole 250 for the HAMR transducer 230'. In addition, the gradient in the thermal profile may be increased. The isothermal lines in the cross-track direction may also be flattened. In addition, the MFS 273' further directs the thermal profile toward the main pole 250 but may be less likely to fail. Thus, writing and reading for the transducer 230' and HAMR disk drive 200' may be improved.

Figure 7:
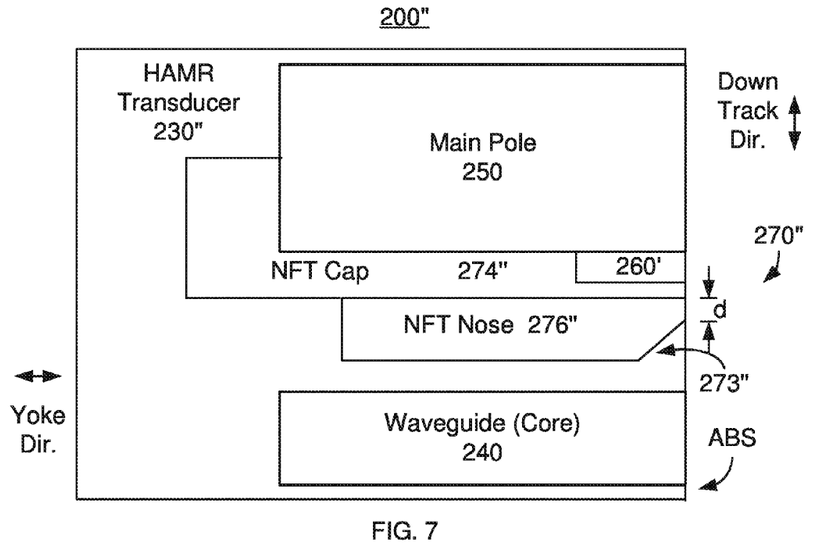
FIG. 7 is a diagram depicting an apex view of another exemplary embodiment of a HAMR disk drive.

FIG. 7 depicts an apex view of another exemplary embodiment of a portion of the HAMR disk drive 200" and transducer 230". For clarity, FIG. 7 is not to scale. For simplicity not all portions of the HAMR disk drive 200" are shown. In addition, although the HAMR disk drive 200" is depicted in the context of particular components other and/or different components may be used. Further, the arrangement of components may vary in different embodiments. The HAMR disk drive 200" is analogous to the HAMR disk drives 100, 100', 100", 200 and/or 200'. Consequently, similar components have analogous labels. The HAMR transducer 230" thus includes waveguide 240, main pole 250, dielectric gap 260 and NFT 270" that are analogous to the waveguides 140, main pole 150, dielectric gap 160/160'/160"/260 and NFT 170/170'/170"/270/270', respectively. For clarity, components such as the laser, media, optional plasmonic ridge and other components are not shown.

The NFT 270" includes the NFT nose 276" and the NFT cap 274" that are analogous to the NFT nose 176/176'/176"/276/276' and NFT cap 174/174'/174"/274/274', respectively. The NFT cap 274" adjoins the sides and back of the dielectric gap 260'. A portion of the NFT cap 274" also adjoins the bottom of the dielectric gap 260'. The NFT nose 276" adjoins part of the bottom of the NFT cap 274". Thus, the HAMR transducer 230" is analogous to the transducer 130'. In addition, the NFT nose 276" has a MFS 273" that is analogous to the MFS 273/273' and, therefore, is shaped. The NFT nose 276" thus has a shape analogous to the NFT nose 276'.

The disk drive 200" and transducer 230" share the benefits of the HAMR disk drive 100, 100', 100", 200 and/or 200' and transducer 130, 130', 130", 200 and/or 200'. The presence of the dielectric gap 260 between a portion of the NFT 270" and the main pole 250 at and near the ABS. Thus, the peak in the thermal profile is shifted in the down track direction toward the main pole 250 for the HAMR transducer 230". In addition, the gradient in the thermal profile may be increased. The isothermal lines in the cross-track direction may also be flattened. In addition, the MFS 273" further directs the thermal profile toward the main pole 250 but may be less likely to fail. Thus, writing and reading for the transducer 230" and HAMR disk drive 200" may be improved.

Figure 8:
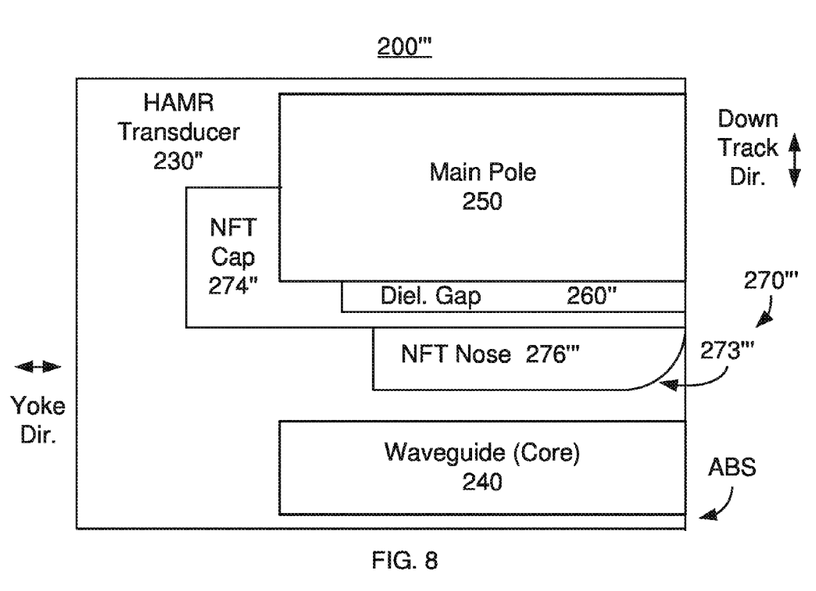
FIG. 8 is a diagram depicting an apex view of another exemplary embodiment of a HAMR disk drive.

FIG. 8 depicts an apex view of another exemplary embodiment of a portion of the HAMR disk drive 200''' and transducer 230'''. For clarity, FIG. 8 is not to scale. For simplicity not all portions of the HAMR disk drive 200''' are shown. In addition, although the HAMR disk drive 200''' is depicted in the context of particular components other and/or different components may be used. Further, the arrangement of components may vary in different embodiments. The HAMR disk drive 200''' is analogous to the HAMR disk drives 100, 100', 100", 200, 200' and/or 200". Consequently, similar components have analogous labels. The HAMR transducer 230''' thus includes waveguide 240, main pole 250, dielectric gap 260' and NFT 270''' that are analogous to the waveguides 140, main pole 150, dielectric gap 160/160'/160"/260/260' and NFT 170/170'/170"/270/270', respectively. For clarity, components such as the laser, media, optional plasmonic ridge and other components are not shown.

The NFT 270" includes the NFT nose 276" and the NFT cap 274" that are analogous to the NFT nose 176/176'/176"/276/276' and NFT cap 174/174'/174"/274/274', respectively. The NFT cap 274" adjoins the sides, back and bottom of the dielectric gap 260". In the embodiment shown in FIG. 8, the dielectric gap 260" extends further in the yoke direction, along the bottom of the main pole 250. However, other configurations are possible. The NFT nose 276''' adjoins part of the bottom of the NFT cap 274'''. In addition, the NFT nose 276''' has a MFS 273''' that is curved. The curved MFS 273''' is shown as smooth. In other embodiments, however, the curved MFS 273''' may be stepped or have another geometer. Like the MFS 273, 273' and 273", the curved MFS 273 is configured such that the NFT nose 276''' closest to the main pole 250 is also closest to, or occupies, the ABS. The NFT nose 276''' thus tends to shift the peak in the energy delivered to the media closer to the main pole 250.

The disk drive 200''' and transducer 230''' share the benefits of the HAMR disk drive 100, 100', 100", 200, 200', and/or 200" and transducer 130, 130', 130", 200, 200' and/or 200". The presence of the dielectric gap 260 between a portion of the NFT 270" and the main pole 250 at and near the ABS. Thus, the peak in the thermal profile is shifted in the down track direction toward the main pole 250 for the HAMR transducer 230". In addition, the gradient in the thermal profile may be increased. The isothermal lines in the cross-track direction may also be flattened. In addition, the MFS 273" further directs the thermal profile toward the main pole 250 but may be less likely to fail. Thus, writing and reading for the transducer 230" and HAMR disk drive 200" may be improved.

Various features of the HAMR transducer, NFT, and dielectric gap are highlighted in FIGS. 2A-8. One of ordinary skill in the art will readily recognize that one or more of these features may be combined in manners not explicitly described herein.

Figure 9:
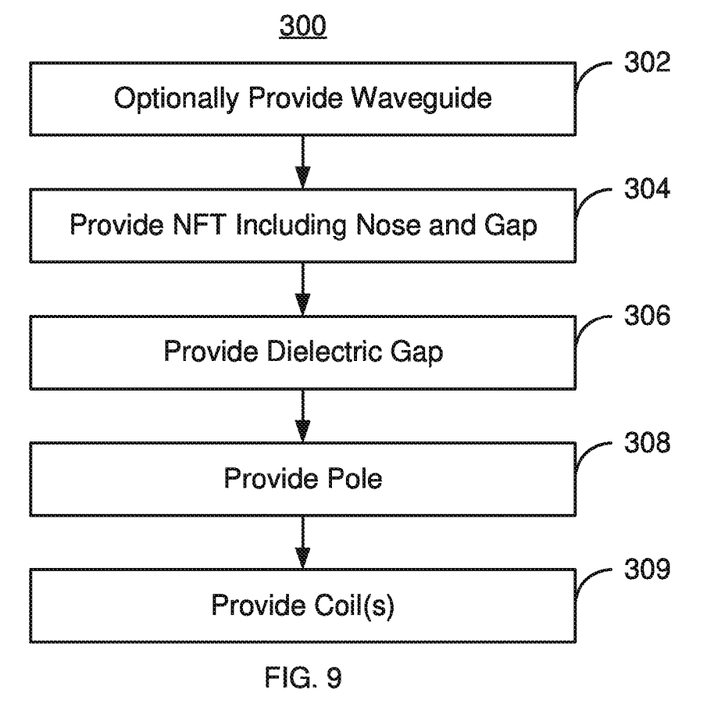
FIG. 9 is a flow chart depicting an exemplary embodiment of a method for fabricating a HAMR write apparatus.

FIG. 9 is a flow chart depicting an exemplary embodiment of a method 300 for fabricating a HAMR write apparatus. The method 300 may be used in fabricating disk drives such as the disk drives 100, 100', 100", 200, 200', 200" and/or 200''', though other transducers might be so fabricated. For clarity, the method 300 is described in the context of the disk drives 100 and 200 depicted in FIGS. 2A-2C and 5. For simplicity, some steps may be omitted, performed in another order, interleaved and/or combined. The HAMR disk drives being fabricated may include a write transducer and a read transducer (not shown) and resides on a slider. For simplicity, however, the read transducer is not discussed. The method 300 is also described in the context of forming a transducer. However, the method 300 may be used to fabricate multiple transducer(s) at substantially the same time. The method 300 and system are also described in the context of particular layers. However, in some embodiments, such layers may include multiple sub-layers. The method 300 also may commence after formation of other portions of the disk drive.

The waveguide 140/240 may be provided, via step 302. Step 302 may include depositing a layer of core material on a cladding layer, patterning the core material and refilling the region with an additional cladding layer. However, other method may be used.

The NFT 170/270 is provided, via step 304. Step 304 includes providing the NFT nose 176/276 and the NFT cap 174/274. Step 304 may include one or more steps of depositing metal layers and patterning the layers.

The dielectric gap 160/260 is fabricated, via step 306. Because the dielectric gap 160/260 resides between the NFT nose 176/276 and the NFT cap 174/274, at least part of step 306 may be interleaved with part(s) of step 302.

A main pole 150/250 is formed, via step 308. Step 308 may include multiple substeps such as forming a trench for the main pole in a layer, plating the high saturation magnetization material(s) for the main pole and planarizing these materials. At least one coil 132 for energizing the main pole is provided, via step 309. Step 309 generally includes multiple deposition and removal steps to form the coil. The coil 132 may be a spiral coil, a toroidal coil or have another shape.

Using the method 300, the HAMR devices 100, 100', 100", 200, 200', 200" and/or 200''' may be fabricated. The benefit(s) of one or more of the HAMR disk drive(s) 100, 100', 100", 200, 200', 200" and/or 200''' may thus be achieved.

Figure 10:
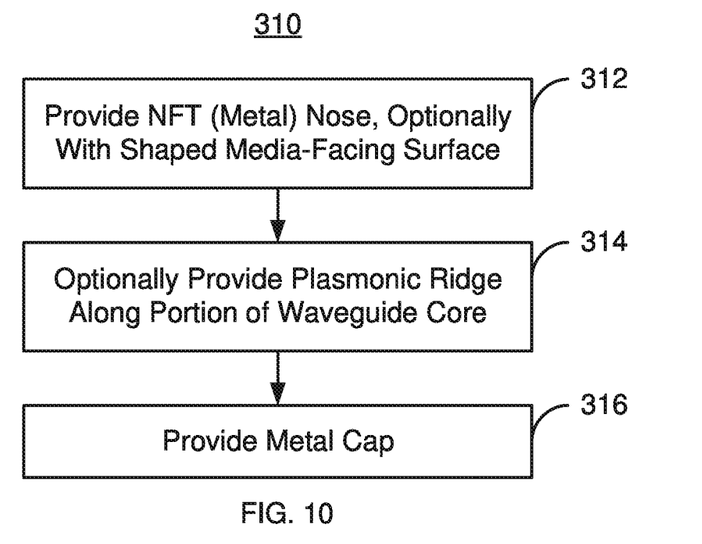
FIG. 10 is a flow chart depicting an exemplary embodiment of a method for fabricating an NFT for a HAMR write apparatus.

FIG. 10 is a flow chart depicting an exemplary embodiment of a method 310 for fabricating a portion of a HAMR disk drive. For example, the method 310 may primarily be used in forming the NFTs 170, 170', 170", 270, 270', 270"

and/or 270'''. However, other waveguides might be fabricated. For clarity, the method 310 is described in the context of the disk drives 100 and 200 depicted in FIGS. 2A-2C and 5. For simplicity, some steps may be omitted, performed in another order, interleaved and/or combined. The HAMR disk drives being fabricated may include a write transducer and a read transducer (not shown) and resides on a slider. For simplicity, however, the reader is not discussed. The method 310 is also described in the context of forming a transducer. However, the method 310 may be used to fabricate multiple transducer(s) at substantially the same time. The method 310 and system are also described in the context of particular layers. However, in some embodiments, such layers may include multiple sub-layers. The method 310 also may commence after formation of other portions of the disk drive.

The metal nose for the NFT 170/270 is provided, via step 312. Step 312 typically includes depositing and shaping the NFT 170/270. Thus, step 312 may include shaping the MFS 273 to the desired configuration. The plasmonic ridge 172 may also be formed, via step 314. The metal cap 174/274 may also be provided, via step 316. Step 316 may also include performing multiple deposition and patterning steps.

Using the method 310, the NFTs for the HAMR devices 100, 100', 100", 200, 200', 200" and/or 200''' may be fabricated. The benefit(s) of one or more of the HAMR disk drive(s) 100, 100', 100", 200, 200', 200" and/or 200''' may thus be achieved.

We claim:

1. A heat assisted magnetic recording (HAMR) write apparatus coupled with a laser for providing energy and having an air-bearing surface (ABS) configured to reside in proximity to a media during use, the HAMR apparatus comprising:
    a main pole configured to write to a region of the media;
    at least one coil for energizing the main pole;
    a waveguide optically coupled with the laser and directing a portion of the energy toward the ABS;
    near-field transducer (NFT) optically coupled with the waveguide, the NFT including a metal nose and a metal cap, a portion of the metal cap adjoining a portion of the main pole; and
    a dielectric gap between a first portion of the NFT and the main pole, the dielectric gap having a media-facing surface occupying a portion of the ABS, a back surface, a top surface, a bottom surface and a plurality of side surfaces, the top surface adjoining the main pole, the bottom surface adjoining the first portion of the NFT, the plurality of side surfaces adjoining a second portion of the NFT, and the back surface adjoining a portion of the metal cap.

2. The HAMR write apparatus of claim 1 wherein the plurality of side surfaces adjoin an additional portion of the metal cap.

3. The HAMR write apparatus of claim 1 wherein the bottom surface adjoins an additional portion of the metal cap.

4. The HAMR write apparatus of claim 1 wherein the bottom surface adjoins a portion of the metal nose.

5. The HAMR write apparatus of claim 1 wherein the portion of the metal cap resides between the metal nose and the main pole.

6. The HAMR write apparatus of claim 1 wherein the NFT further includes:
    a plasmonic ridge aligned with a portion of the waveguide.

7. The HAMR write apparatus of claim 6 wherein the waveguide directs the portion of the energy toward the ABS at an acute angle from the ABS, the plasmonic ridge being oriented at the angle from the ABS.

8. The HAMR write apparatus of claim 1 wherein the metal nose includes a media-facing surface, at least a portion of the media-facing surface being oriented at a nonzero angle from the ABS.

9. The HAMR write apparatus of claim 8 wherein all of the media-facing surface is oriented at a nonzero angle from the ABS.

10. The HAMR write apparatus of claim 8 wherein the media-facing surface is a curved surface.

11. The HAMR write apparatus of claim 1 wherein the dielectric gap is substantially surrounded by a combination of the NFT and the ABS.

12. A heat assisted magnetic recording (HAMR) data storage device comprising:
    a media,
    a laser for providing energy; and
    a slider including a HAMR write transducer having an air-bearing surface, the HAMR transducer including a main pole, at least one coil for energizing the main pole, near-field transducer (NFT), and a dielectric gap, the main pole being configured to write to a region of the media, the waveguide being optically coupled with the laser and for directing a portion of the energy toward the ABS, the NFT being optically coupled with the waveguide, the NFT including a metal nose and a metal cap, a portion of the metal cap adjoining a portion of the main pole; the dielectric gap being between a first portion of the NFT and the main pole, the dielectric gap having a media-facing surface occupying a portion of the ABS, a back surface, a top surface, a bottom surface and a plurality of side surfaces, the top surface adjoining the main pole, the bottom surface adjoining the first portion of the NFT, the plurality of side surfaces adjoining a second portion of the NFT, and the back surface adjoining a portion of the metal cap such that the dielectric gap is substantially surrounded by a combination of the NFT and the ABS.

13. A method for fabricating a heat assisted magnetic recording (HAMR) write apparatus coupled with a laser for providing energy and having an air-bearing surface (ABS) configured to reside in proximity to a media during use, the method comprising:
    providing a main pole configured to write to a region of the media, the main pole including a media-facing surface;
    providing at least one coil for energizing the main pole;
    providing a waveguide optically coupled with the laser and directing a portion of the energy toward the ABS;
    providing near-field transducer (NFT) optically coupled with the waveguide, the NFT including a metal nose and a metal cap, a portion of the metal cap adjoining a portion of the main pole; and
    providing a dielectric gap between a first portion of the NFT and the main pole, the dielectric gap having a media-facing surface occupying a portion of the ABS, a back surface, a top surface, a bottom surface and a plurality of side surfaces, the top surface adjoining the main pole, the bottom surface adjoining the first portion of the NFT, the plurality of side surfaces adjoining a second portion of the NFT, and the back surface adjoining a portion of the metal cap.

14. The method of claim 13 wherein the dielectric gap is substantially surrounded by a combination of the NFT and the ABS.

15. The method of claim 13 wherein the portion of the metal cap resides between the metal nose and the main pole.

16. The method of claim 13 wherein the step of providing the NFT further includes:
   providing a plasmonic ridge aligned with a portion of the waveguide.

17. The method of claim 13 wherein the step of providing the NFT further includes:
   forming a media-facing surface on the metal nose, at least a portion of the media-facing surface being oriented at a nonzero angle from the ABS.

18. The method of claim 17 wherein all of the media-facing surface is oriented at a nonzero angle from the ABS.

19. The method of claim 17 wherein the media-facing surface is a curved surface.

\* \* \* \* \*